(12) United States Patent
Chang (10) Patent No.: US 9,944,745 B2
(45) Date of Patent: Apr. 17, 2018

(54) FLAME RETARDANT AND AUTO-CATALYTIC POLYESTERS FOR POLYURETHANES

(71) Applicant: COIM ASIA PACIFIC Pte. LTD., Singapore (SG)

(72) Inventor: Wally Liyuan Chang, White Plains, NY (US)

(73) Assignee: COIM ASIA PACIFIC PTE. LTD., Singapore (SG)

( * ) Notice: Subject to any disclaimer, the term of this patent is extended or adjusted under 35 U.S.C. 154(b) by 0 days.

(21) Appl. No.: 15/168,105

(22) Filed: May 30, 2016

(65) Prior Publication Data
US 2016/0347909 A1     Dec. 1, 2016

Related U.S. Application Data

(60) Provisional application No. 62/167,390, filed on May 28, 2015.

(30) Foreign Application Priority Data

Jun. 29, 2015 (IT) ........................ 102015000028556

(51) Int. Cl.
| | |
|---|---|
| C08K 5/34 | (2006.01) |
| C08G 18/46 | (2006.01) |
| C08K 5/3492 | (2006.01) |
| C08K 3/32 | (2006.01) |
| C08G 18/76 | (2006.01) |
| C08G 63/685 | (2006.01) |
| C08G 63/91 | (2006.01) |
| C08G 69/44 | (2006.01) |
| C08G 18/54 | (2006.01) |
| C08J 9/14 | (2006.01) |
| C08G 18/16 | (2006.01) |
| C08G 18/18 | (2006.01) |
| C08G 18/22 | (2006.01) |
| C08G 18/40 | (2006.01) |
| C08G 73/06 | (2006.01) |
| C08G 101/00 | (2006.01) |

(52) U.S. Cl.
CPC ....... *C08G 18/4661* (2013.01); *C08G 18/163* (2013.01); *C08G 18/1825* (2013.01); *C08G 18/225* (2013.01); *C08G 18/4018* (2013.01); *C08G 18/4027* (2013.01); *C08G 18/4684* (2013.01); *C08G 18/544* (2013.01); *C08G 18/7664* (2013.01); *C08G 18/7692* (2013.01); *C08G 63/6854* (2013.01); *C08G 63/6856* (2013.01); *C08G 63/912* (2013.01); *C08G 63/916* (2013.01); *C08G 69/44* (2013.01); *C08G 73/0644* (2013.01); *C08J 9/143* (2013.01); *C08K 3/32* (2013.01); *C08K 5/34928* (2013.01); *C08G 2101/0008* (2013.01); *C08G 2101/0025* (2013.01); *C08G 2101/0041* (2013.01); *C08G 2105/02* (2013.01); *C08G 2170/60* (2013.01); *C08G 2190/00* (2013.01); *C08G 2350/00* (2013.01); *C08K 2003/329* (2013.01)

(58) Field of Classification Search
CPC  C08G 73/0638; C08G 18/08; C08G 18/7692; C08G 18/4661; C08K 5/34928; C08K 3/32; C08K 2003/329
USPC ......................................................... 524/101
See application file for complete search history.

(56) References Cited

U.S. PATENT DOCUMENTS

| | | | |
|---|---|---|---|
| 3,001,973 A | 9/1961 | Piepenbrink | |
| 3,124,605 A | 3/1964 | Wagner | |
| 3,201,372 A | 8/1965 | Wagner | |
| 3,277,138 A | 10/1966 | Holtschmidt | |
| 3,394,164 A | 7/1968 | McClellan | |
| 3,401,190 A | 9/1968 | Schmitt | |
| 3,454,606 A | 7/1969 | Brotherton | |
| 3,492,330 A | 1/1970 | Trecker | |
| 4,868,224 A | 9/1989 | Harasin et al. | |
| 2004/0266916 A1* | 12/2004 | Harashina ............ | C08K 3/0058 523/217 |
| 2016/0060385 A1* | 3/2016 | Leemans ................ | C08G 63/16 528/275 |

FOREIGN PATENT DOCUMENTS

| | | | |
|---|---|---|---|
| EP | 0376380 A1 | 7/1990 | |
| JP | 56122829 A * | 9/1981 | |
| JP | S56122829 A | 9/1981 | |
| JP | 63196626 A * | 8/1988 | |
| JP | S63196626 A | 8/1988 | |
| WO | 9629357 A1 | 9/1996 | |
| WO | WO 9629357 A1 * | 9/1996 | ......... C08G 63/6856 |
| WO | 2014135712 A2 | 9/2014 | |

OTHER PUBLICATIONS

Translation of JP 56122829, Sep. 26, 1981.*
Technical datasheet of Melapur 200, Jun. 8, 2016.*
Translation of JP95068345, Jul. 26, 1995.*
Osipenko, I.F.; Tsvilik, G.L.; Mishkina, L.I., Modification of poly-(ethylene terephthalate) with 2, 4, 6-triamino-1, 3, 5-triazine (melamine), Database Caplus (online), Jan. 1, 1989, XP002003668, database accession No. 1990-181245.
Database WPI, Week 198145, Thomson Scientific, London GB; AN 1981-82596D, XP002754299.

* cited by examiner

*Primary Examiner* — Hui H Chin
(74) *Attorney, Agent, or Firm* — Robert E. Alderson, Jr.

(57) ABSTRACT

Flame retardant polyesters obtainable by reacting an aromatic or aliphatic dicarboxylic acid and/or ester of anhydride thereof, with an aliphatic polyol or mixtures thereof and with melamine, are provided. Methods of making said polyesters are also provided.

16 Claims, 4 Drawing Sheets

Rate of Foam Formation

FLAME RETARDANT AND AUTO-CATALYTIC POLYESTERS FOR POLYURETHANES

CROSS REFERENCE TO RELATED APPLICATIONS

This application claims priority to and benefit of U.S. Provisional Patent Application No. 62/167,390 filed May 28, 2015 and of Italian Patent Application No. 102015000028556 filed Jun. 29, 2015, the contents of which are incorporated by reference in their entirety.

FIELD OF THE INVENTION

The present invention relates to a polyester (polyol) having flame retardant properties and to its use, particularly, for the production of polyurethanes and polyisocyanurate products equally endowed with flame retardant properties.

BACKGROUND OF THE INVENTION

Melamine and melamine cyanurate are well-known flame retardant compounds conventionally used as an additive to polymers and polymeric blends.

However, melamine and melamine cyanurate are solid and therefore not easy to use. If melamine is used as an additive in polymeric blends, melamine will settle out of the system due to its solid particles. In spray-rigid foam systems, for instance, the melamine solid particles will clog the spray gun nozzle.

Some liquid flame retardants, such as halogen-containing or phosphorous-containing chemicals, can be used as additives; however, halogen- or phosphorous-containing chemicals are toxic, corrosive and generally more expensive than melamine and melamine cyanurate, whereas melamine is a non-halogen, non-phosphorous, non-toxic, non-corrosive and generally less expensive chemical.

JP 1495362 describes a fire-retardant polyester obtained by thermally polymerizing thermoplastic polyester forming monomers with added melamine and cyanuric acid; the process makes use of an equi-molar amount of cyanuric acid and melamine, thereby forming a complex compound which is melamine cyanurate complex; the resulting mixture is polymerized in the presence water at 200-300° C. to provide a polyester containing melamine cyanurate uniformly and finely dispersed in the polyester. Since melamine is totally neutralized by cyanuric acid, therefore, there is no —NH2 group to react onto the polymer backbone, whereby solid melamine cyanurate acts as an additive in the polyester.

EP 376 380 relates to an aromatic polymer with a liquid-crystalline behavior including one or more tri-functional triazine units. The described process contemplates reacting aromatic polyester forming monomers and adding a triazine when the polymer reaches the desired degree of polymerization. It is disclosed that the addition of a small amount of triazine (melamine) can improve the mechanical properties and thermal shock resistance of the obtained liquid-crystal high molecular weight polymer.

WO 2014/135712 describes a process for preparing a high molecular weight polyester which comprises reacting a dicarboxylic acid and a diol in the presence of a triazine derivative. The concentration of triazine derivative, which is determined by the concentration of nitrogen atoms, is generally from 1,000 ppm to 10,000 ppm with a preferred concentration of from 1,000 ppm to 2,500 ppm. The addition of a small amount of melamine derivatives is described as suitable to improve high molecular weight polymer crystallization rate.

An object of the present invention is to provide a polyester (polyol) having flame-retardant properties, wherein melamine is synthetized onto the polyester backbone.

Another object of the invention is to provide a novel polyester which is suitable to react with isocyanate to form polyurethane or polyisucyanurate that can be used, among the others, for rigid foam, spray foam, flexible foam, cast elastomers, TPU (thermoplastic polyurethane), adhesives, coatings, sealants, fiber applications, in order to obtain flame retardancy.

SUMMARY OF THE INVENTION

In view of the above-mentioned objects, the invention provides polyesters obtainable by the polycondensation reaction of a dicarboxylic acid and/or an ester or anhydride thereof, with an aliphatic polyol or a mixture thereof and with melamine, wherein said aliphatic polyol comprises at least a glycol and optionally an aliphatic polyol having more than two OH groups selected from the group consisting of glycerin, trimethylolpropane, pentaerythritol, dipentaerythritol, tripentaerythritol, sorbitol, glucose, sucrose, polyglycerol and mixtures thereof.

Figure 1:
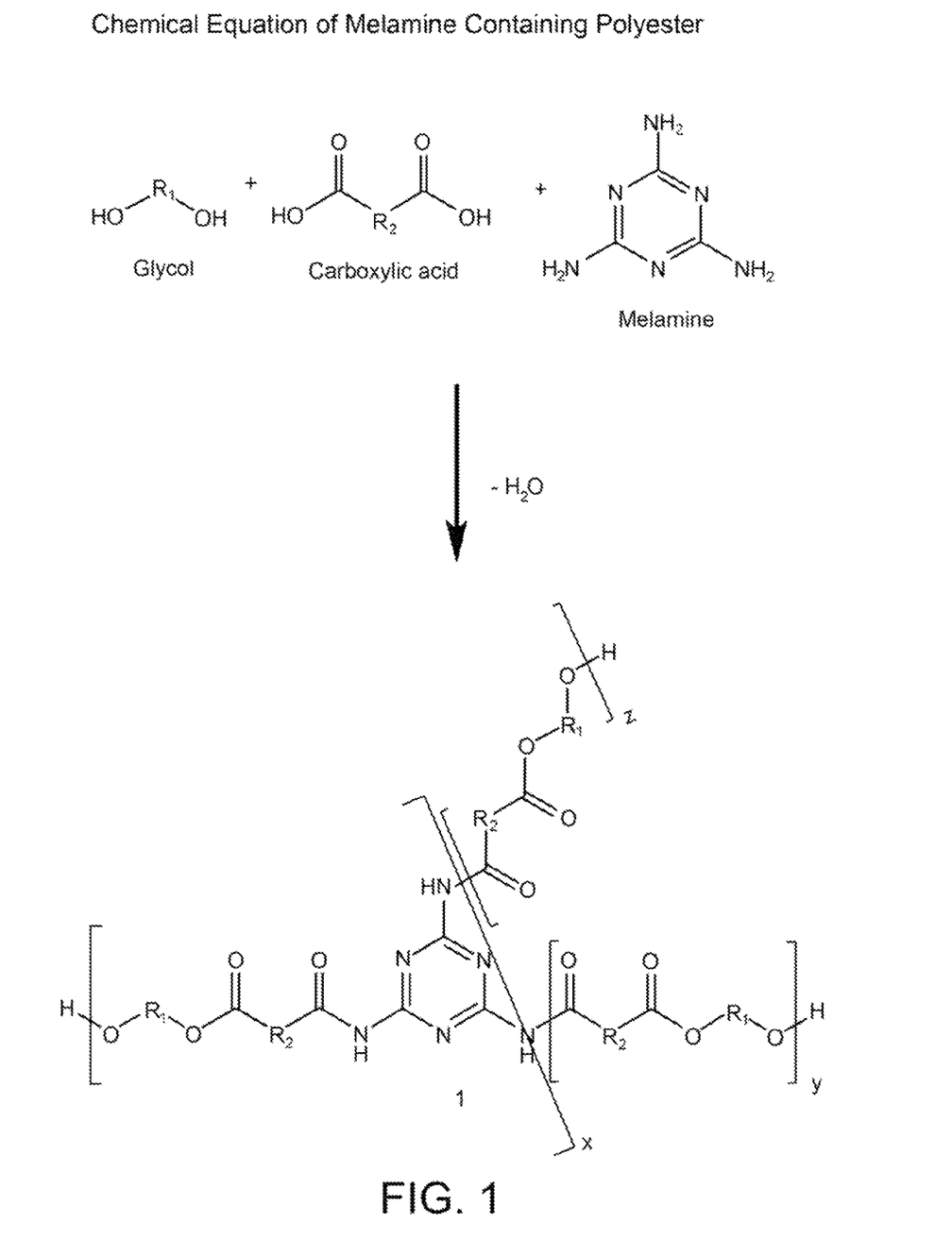
FIG. 1 shows the chemical equation for the production of a melamine containing polyester according to an embodiment of the invention.

The polyester of the invention may be obtained by the reaction equation shown in FIG. 1.

The obtained polyester may have the chemical structure of general formula (I) below:

wherein:

R1 is an aliphatic group, preferably an alkylene group, optionally including one or more oxyalkylene groups and R2 is an aromatic or aliphatic group.

Figure 2:
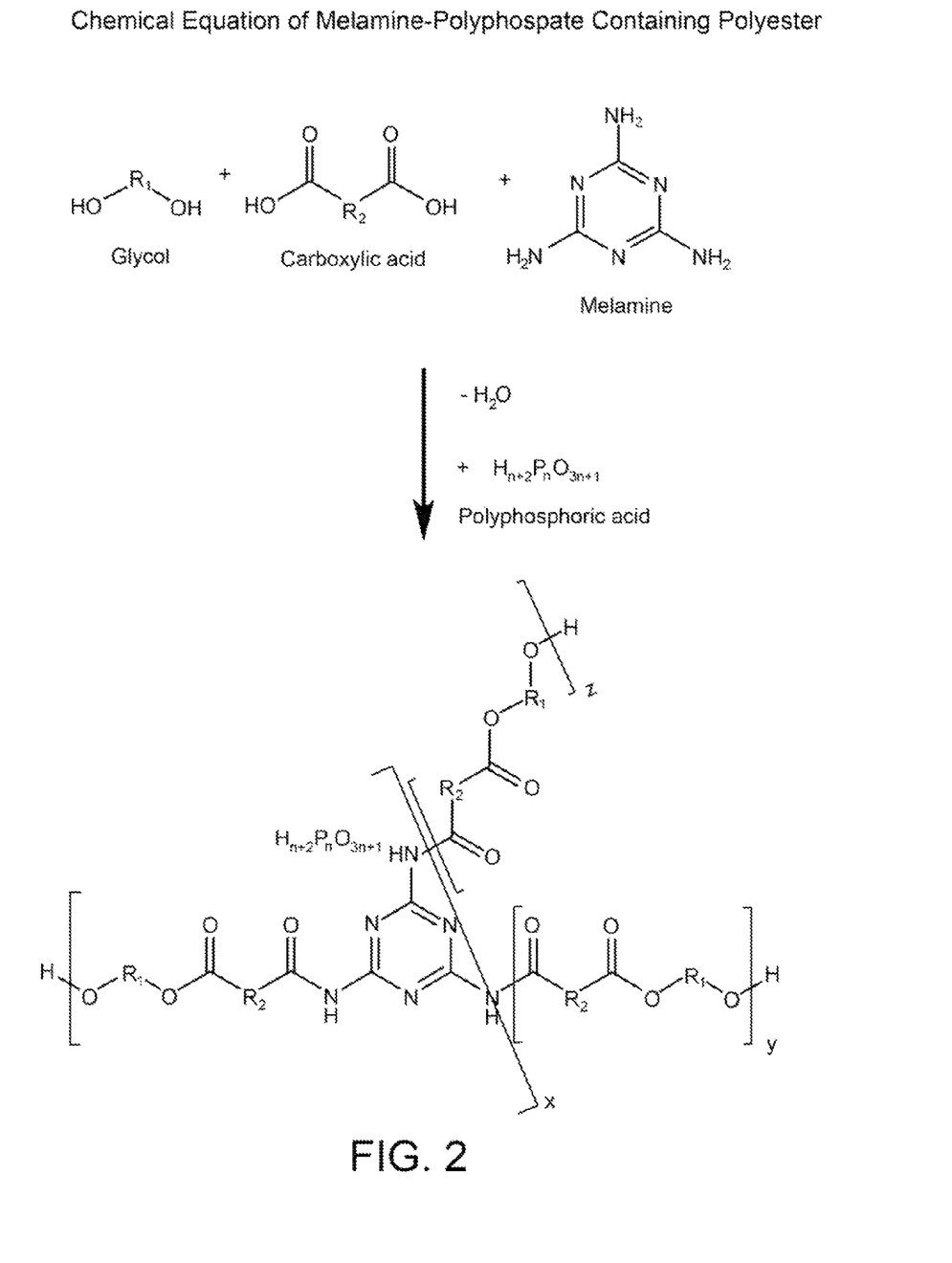
FIG. 2 shows the chemical equation for a melamine-polyphosphate containing polyester of the invention and, FIG. 3 shows the chemical equation of a melamine-cyanurate-containing polyester according to an embodiment of the invention.

The invention further provides melamine cyanurate-containing polyesters which can be obtained by further neutralizing the polyester of the invention with cyanuric acid; the preferred chemical reaction equation is shown in FIG. 2.

The invention further provides melamine polyphosphate-containing polyesters which can be obtained from the polyester of the invention, preferably from the polyester of formula (I) above, by further neutralization with polyphosphoric acid. The preferred chemical reaction equation is shown in FIG. 3.

Figure 3:
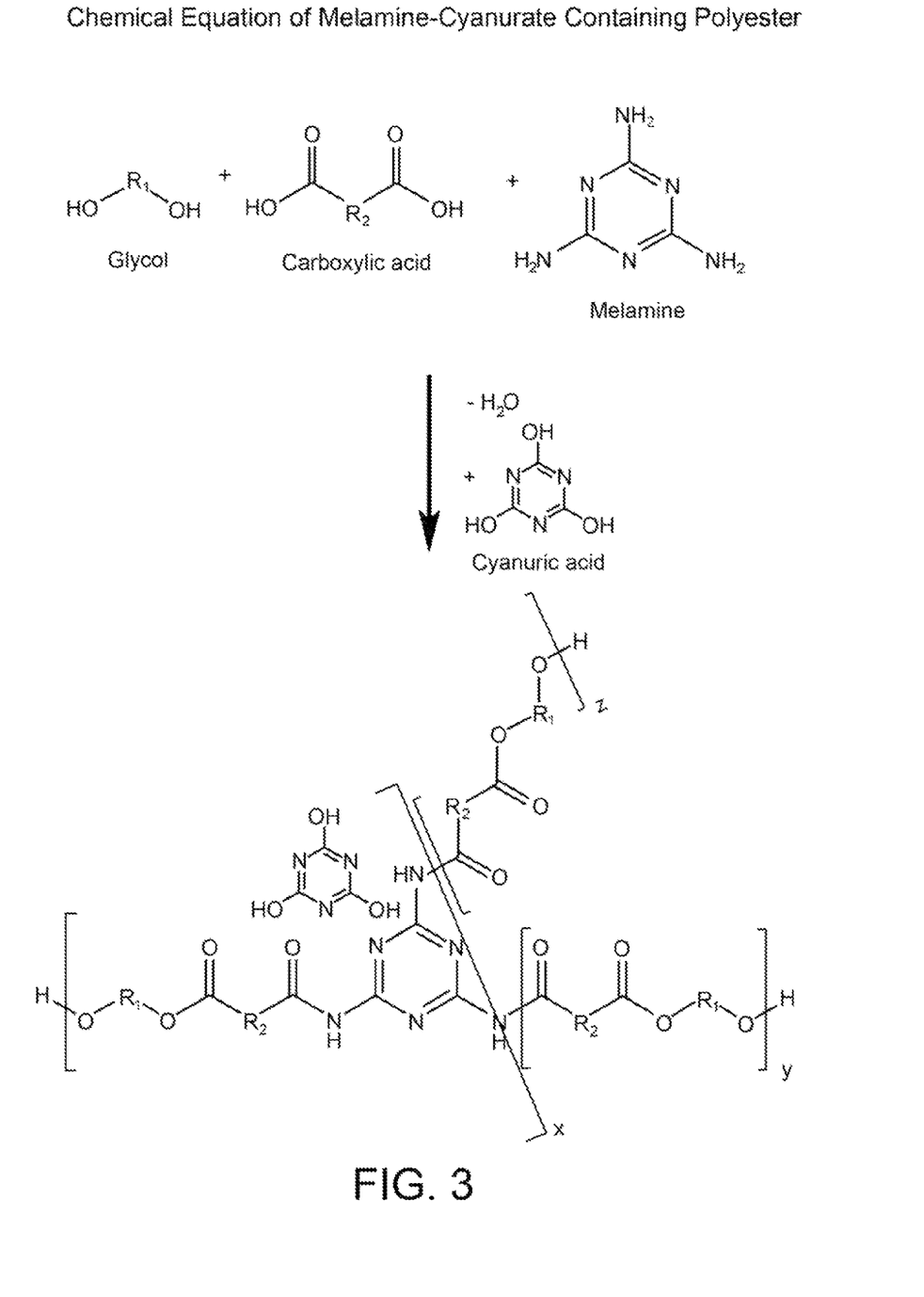
Figure 4:
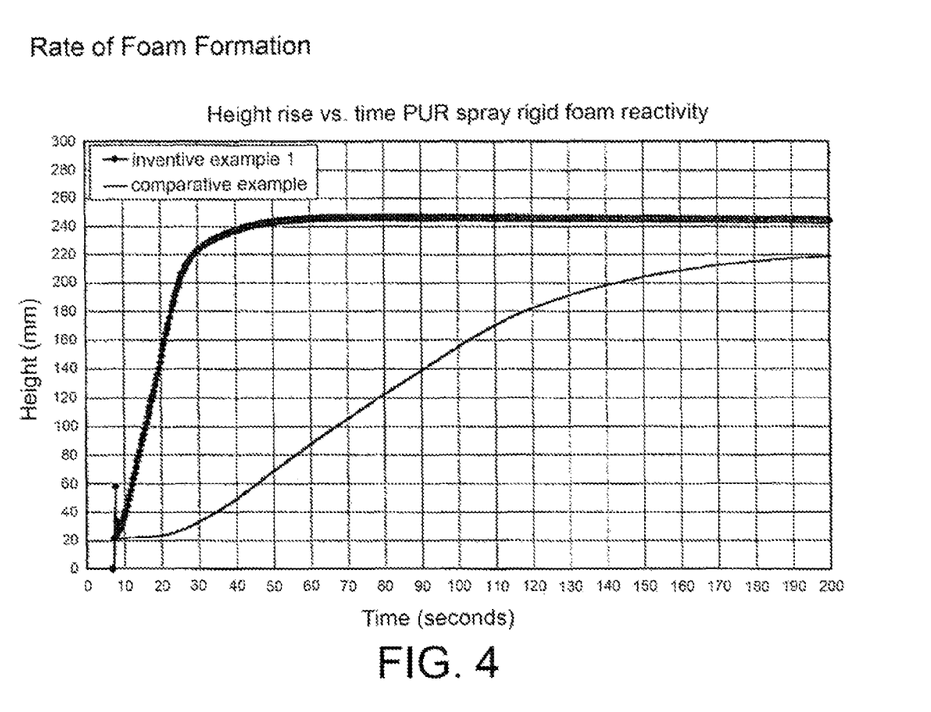
FIG. 4 is a diagram that shows the rate of foam formation (height rise vs. time) in PUR spray rigid foam production with the use of the polyester according to an embodiment of the invention according to Example 1 (which follows) and with the use of a conventional polyester according to the Comparative Example.
Figure 5:
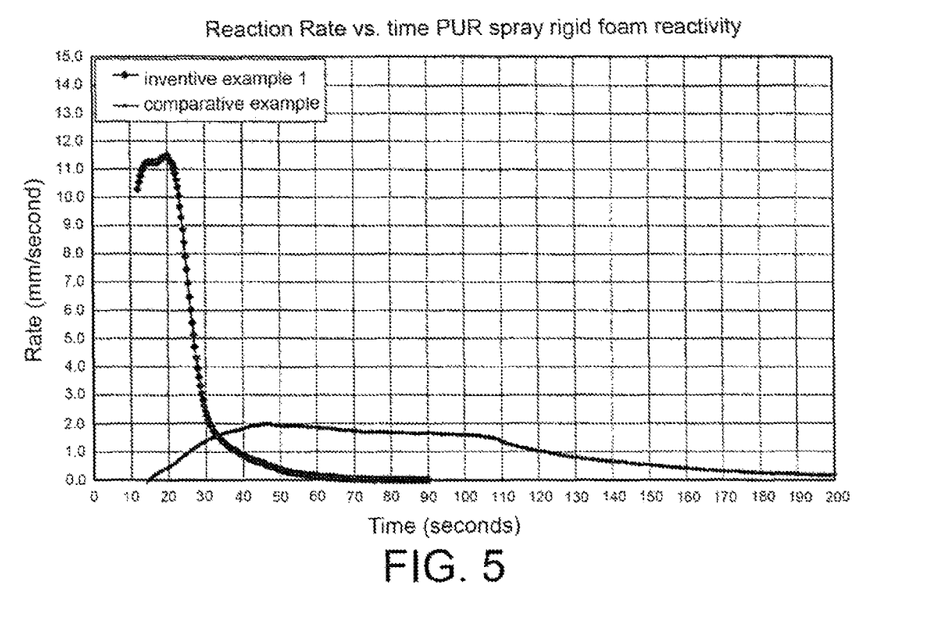
FIG. 5 is a diagram which shows the rate of foam formation (reaction rate vs. time) in PUR spray rigid foam production with the use of a polyester according to Example 1 and with the use of a conventional polyester, according to the Comparative Example.

The invention further provides methods or processes for the production of polyurethanes and/or polyisocyanurates which make use, as the polyester polyol, of the melamine containing polyester, or of the melamine-polyphosphate containing polyester or of the melamine-cyanurate polyester of the invention which may be obtained by any of the chemical equations of FIGS. 1 to 3.

Further characteristics and advantages of the polyester of the invention and of its use are provided by means of the detailed description and examples below.

DETAILED DESCRIPTION

The invention provides polyester including melamines in the polyester backbone according to formula (I) above, wherein, preferably:

$R_1$ is an alkylene group —$(CH_2)_n$— wherein n is an integer from 1 to 20, preferably from 2 to 12 or an oxyalkylene group —$[(CH_2)_mO]_p$—$(CH_2)_r$, wherein m is an integer from 1 to 10, p is an integer from 1 to 10 and r is an integer from 1 to 10

$R_2$ is an aromatic or aliphatic group, but preferably phenyl; and x, y and z, independently one from the other are integers from 1 to 20

The polycondensation reaction is carried out at a temperature of from 120 to 300° C., preferably from 150 to 260° C., for a time of from 5 to 50 hours, with the use of a conventional polycondensation metal catalyst such as, among the others, titanates, tin compounds, antimony compounds, or without catalyst.

The dicarboxylic acid, ester or anhydride thereof may be aliphatic or aromatic. Suitable aliphatic dicarboxylic acids and esters thereof include compounds of the formula R—OOC—$(CH_2)_n$—COOR, wherein n is preferably from 2 to 10 and R is H or lower ($C_1$-$C_4$)alkyl, preferably methyl or ethyl, such as, among the others, succinic, glutaric, adipic, sebacic, suberic dodecandioic, and fumaric acids and ethyl or methyl esters thereof and mixtures thereof. Also included are anhydrides of the above-mentioned dicarboxylic acids, generally used in admixture with the dicarboxylic acid.

Suitable aromatic dicarboxyilic acids and esters thereof include compounds of the formula ROOC-Ph-COOR, where Ph is phenyl and R is H or lower ($C_1$-$C_4$)alkyl, preferably methyl or ethyl and the carboxyl groups are in the ortho-, meta- or para-positions, such as terephthalic acid, dimethyl or diethyl terephthalate, isophthalic acid. Also included are other polybasic acids, such as benzene tricarboxylic acids or polycarboxy substituted diphenyls and polyphenyls and the corresponding lower alkyl esters. Also included are anhydrides of the above-mentioned aromatic acids such as particularly phthalic anhydride which is generally used in admixture with the dicarboxylic aromatic acid or ester, and recycled polyethylene terephthalate.

The aliphatic polyol, includes, but is not limited to ethylene glycol, diethylene glycol, triethylene glycol, propylene glycol, butylene glycols and in general polyethylene glycols of formula OH—$(CH_2$—$CH_2O)_t$— wherein t may be from 1 to 20 and in general polypropylene glycols of formula OH—$(CH_2$—$CH(CH3)O)_t$— wherein t may be from 1 to 20.

In certain embodiments, it is particularly preferred to use of polyethylene glycol having a molecular weight of from 100 to 3,000, more preferably together with short chain glycols such as ethylene glycol, diethylene glycol, triethylene glycol, tetraethylene glycol, propylene glycol, dipropylene glycol, tripropylene glycol, 1,3-propandiol, 1,3-butandiol, 1,4-butanediol, which may be added during the polycondensation reaction to adjust for the loss of glycol during the reaction and to reach the desirable hydroxyl number.

In order to modify the functionality of final polyester, some functionality of glycols other than 2.0 can also be added, such as methoxylated polyethylene glycol, lauryl alcohol, glycerine, trimethylolpropane, pentaerythritol, dipentaerythritol, tripentaerythritol, sorbitol, glucose, sucrose, and polyglycerol.

In order to modify the properties of the final polyester, some natural oils can also be added, such as, among the others, soybean oil, rapeseed oil, castor oil, corn oil, sunflower oil.

The polyester of the invention can be prepared according to known polyester chemistry.

In the preparation process, melamine may be added in any amount suitable to provide flame-retardant properties in the obtained polyester.

Melamine may be added so as to achieve in the final polyester an amount of melamine from 0.5-60 weight percent based on the final polyester, preferably of from 1 to 50 wt %, more preferably from 5 to 50 wt %, even more preferably from 10 to 40 wt %.

The obtained polyester comprises
a) dicarboxylic acid, esters thereof or anhydride thereof derived moieties, as above described,
b) polyol derived moieties, as above described, and
c) melamine derived moieties wherein the melamine derived moieties are present in the polyester backbone, preferably in a molar amount of from 2 to 40% by moles referred to the sum of a), b) and c), more preferably from 5 to 40% by moles and even more preferably from 10 to 30%.

In certain embodiments the polyester of the invention, preferably the polyester of formula (I), may have a number average molecular weight of from 200 to 6,000 Dalton (measured by Gel Permeation Chromatography), an hydroxyl number of from 15 to 600 mgKOH/g, preferably from 30 to 500 and an acid number of from 0 to 10, preferably not higher than 1.

In a further embodiment of the invention, the polyester obtained as above-described, may be further neutralized with polyphosphoric acid, to obtain a melamine polyphosphate containing polyester with further improved flame-retardant properties, preferably according to the chemical equation shown in FIG. 2.

Polyphosphoric acid may be added to the polyester, as obtained from the reaction of dicarboxylic acid, polyol and melamine, preferably after having lowered the reaction temperature to a range of from 10 to 200° C. for a time of from 5 minutes to 120 minutes.

Typically, polyphosphoric acid may be added to the polyester in the amount of from 0.5 to 30 weight percent based on the final polyester In a further embodiment of the invention, a melamine cyanurate-containing polyester is obtained by first reacting, according to the polycondensation reaction, the dicarboxylic acid or ester or anhydride thereof, polyol and melamine to obtain an intermediate polyester, followed by the addition of cyanuric acid, preferably still at the polycondensation temperature, and further conducting the neutralization for a time of from 1 to 30 hours.

The amount of cyanuric acid which is added may be in the range of from 0.5 to 30 weight percent based on the final polyester.

The polyester of the invention, in all the above-mentioned embodiments, is particularly suitable for the production of polyurethanes or polyisocyanurates, according to the conventional reaction with isocyanate, optionally with the use of a blowing agent.

It has been found that the novel melamine-containing polyester of the invention exhibits an auto-catalytic function due to N (nitrogen) amino group from melamine.

Therefore, lower amounts of catalyst can be used for the production of polyurethanes or polyisocyanurates according to the PUR (polyurethane) or PIR (polyisocyanurate) technology.

EXAMPLES

Example 1

Melamine-Containing Polyester

| Ingredients | weight, grams | N, ppm based on triazine in polyester molecule | mole % in polyester molecule |
|---|---|---|---|
| diethylene glycol | 125.5 | | 18.05 |
| PEG200 | 473.6 | | 36.21 |
| glycerine | 45.3 | | 7.47 |
| terephthalic Acid | 183.7 | | 13.51 |
| melamine | 150.0 | 92,857 ppm | 18.27 |
| phthalic Anhydride | 70.2 | | 6.49 |
| catalyst | 0.03 | | |
| Reaction Temperature ° C. | 240 | | |
| total charge | 1,048.4 | | |
| water distilled | 48.4 | | |
| total yield | 1,000.0 | | |
| hydroxyl number | 305.0 | | |
| acid number | 1.00 max. | mole % | 100.00 |

Procedure:

A four neck glass flask, equipped with a nitrogen inlet, a stirrer, a column, and a thermometer, was charged with the catalyst, diethylene glycol, PEG200 (polyethylene glycol, molecular weight 200), glycerine, terephthalic acid, phthalic anhydride and melamine. The temperature was increased to 240° C., while the column was kept hot with the electric wire. The nitrogen and agitation were increased, as the reaction proceeded, to facilitate the water removal, but not rapid enough to blow out the glycol.

Hydroxyl number and acid number were checked as needed and the loss of glycol during the reaction was adjusted with diethylene glycol to reach the theoretical hydroxyl number. The reaction was considered complete when the hydroxyl number and the acid number reached the expected numbers.

Example 2

Melamine-Containing Polyester

| Ingredients | weight, grams | N, ppm based on triazine in polyester molecule | mole % in polyester molecule |
|---|---|---|---|
| diethylene glycol | 107.8 | | 14.88 |
| PEG200 | 406.7 | | 29.83 |
| glycerine | 45.4 | | 7.19 |
| terephthalic Acid | 125.3 | | 8.83 |
| phthalic Anhydride | 47.9 | | 4.24 |
| melamine | 300.0 | 185,714 ppm | 35.03 |
| catalyst | 0.03 | | |
| reaction Temperature ° C. | 240 | | |
| total charge | 1,033.0 | | |
| water distilled | 33.0 | | |
| total yield | 1,000.0 | | |
| hydroxyl number | 305.0 | | |
| acid number | 1.00 max. | mole % => | 100.0 |

Procedure:

A four neck glass flask, equipped with a nitrogen inlet, a stirrer, a column, and a thermometer, was charged with the catalyst, diethylene glycol, PEG200 (polyethylene glycol, molecular weight 200), glycerine, terephthalic acid, and phthalic anhydride. The temperature was increased to 240° C., while the column was kept hot with the electric wire. The nitrogen and agitation were increased, as the reaction proceeded, to facilitate the water removal, but not rapid enough to blow out the glycol. Melamine was added when the acid number was below 2.0.

Hydroxyl number and acid number were checked as needed and the loss of glycol during the reaction was adjusted with diethylene glycol to reach the theoretical hydroxyl number. The reaction was considered complete when the hydroxyl number and the acid number reached the expected numbers.

Example 3

Melamine-Containing Polyester

| Ingredients | weight, grams | N, ppm based on triazine in polyester molecule | mole % in polyester molecule |
|---|---|---|---|
| diethylene glycol | 84.7 | | 11.88 |
| PRG200 | 479.4 | | 35.80 |
| ethylene glycol | 49.5 | | 11.80 |
| glycerine | 39.4 | | 6.32 |
| terephthalic Acid | 265.4 | | 19.08 |
| phthalic Anhydride | 101.4 | | 9.17 |
| melamine | 50.0 | 30,952 ppm | 5.9 |
| catalyst | 0.03 | | |
| reaction Temperature ° C. | 240 | | |
| total charge | 1,069.9 | | |
| water distilled | 69.9 | | |
| total yield | 1,000.0 | | |

-continued

| Ingredients | weight, grams | N, ppm based on triazine in polyester molecule | mole % in polyester molecule |
|---|---|---|---|
| hydroxyl number | 265.0 | | |
| acid number | 1.00 max. | mole % total => | 100.00 |

Procedure:

A four neck glass flask, equipped with a nitrogen inlet, a stirrer, a column, and a thermometer, was charged with the catalyst, diethylene glycol, PEG200 (polyethylene glycol, molecular weight 200), glycerine, ethylene glycol, terephthalic acid, phthalic anhydride and melamine. The temperature was increased to 240° C., while the column was kept hot with the electric wire. The nitrogen and agitation were increased, as the reaction proceeded, to facilitate the water removal, but not rapid enough to blow out the glycol.

Hydroxyl number and acid number were checked as needed and the loss of glycol during the reaction was adjusted with diethylene glycol and ethylene glycol to reach the theoretical hydroxyl number. The reaction was considered complete when the hydroxyl number and the acid number reached the expected numbers.

Example 4

Melamine-Containing Polyester

| Ingredients | weight, grams | N, ppm based on triazine in polyester molecule | mole % in polyester molecule |
|---|---|---|---|
| diethylene glycol | 549.5 | | 64.91 |
| adipic acid | 465.2 | | 25.71 |
| melamine | 100.0 | 61,905 ppm | 9.38 |
| Catalyst | 0.03 | | |
| reaction Temperature ° C. | 240 | | |
| total charge | 1,114.7 | | |
| water distilled | 114.7 | | |
| total yield | 1,000.0 | | |
| hydroxyl number | 225.0 | | |
| acid number | 1.00 max | mole % total => | 100.00 |

Procedure:

A four neck glass flask, equipped with a nitrogen inlet, a stirrer, a column, and a thermometer, was charged with the catalyst, diethylene glycol, adipic acid and melamine. The temperature was increased to 240° C., while the column was kept hot with the electric wire. The nitrogen and agitation were increased, as the reaction proceeded, to facilitate the water removal, but not rapid enough to blow out the glycol.

Hydroxyl number and acid number were checked as needed and the loss of glycol during the reaction was adjusted with diethylene glycol to reach the theoretical hydroxyl number. The reaction was considered complete when the hydroxyl number and the acid number reached the expected numbers.

Example 5

Melamine-Containing Polyester

| Ingredients | weight, grams | N, ppm based on triazine in polyester molecule | mole % in polyester molecule |
|---|---|---|---|
| diethylene glycol | 136.3 | | 22.17 |
| PEG200 | 514.1 | | 44.51 |
| soybean oil | 50.0 | | |
| sorbitol (70%) | 25.2 | | 1.66 |
| terephthalic Acid | 234.2 | | 19.52 |
| phthalic Anhydride | 89.5 | | 9.38 |
| melamine | 20.0 | 12,381 ppm | 2.7 |
| catalyst | 0.07 | | |
| reaction Temperature ° C. | 240 | | |
| total charge | 1,069.2 | | |
| water distilled | 69.2 | | |
| total yield | 1,000.0 | | |
| hydroxyl number | 240.0 | | |
| acid number | 1.00 | mole % total => | 100.0 |

Procedure:

A four neck glass flask, equipped with a nitrogen inlet, a stirrer, a column, and a thermometer, was charged with the catalyst, diethylene glycol, PEG200 (polyethylene glycol, molecular weight 200), soybean oil, sorbitol (70%), terephthalic acid, phthalic anhydride and melamine. The temperature was increased to 240° C., while the column was kept hot with the electric wire. The nitrogen and agitation were increased, as the reaction proceeded, to facilitate the water removal, but not rapid enough to blow out the glycol.

Hydroxyl number and acid number were checked as needed and the loss of glycol during the reaction was adjusted with diethylene glycol to reach the theoretical hydroxyl number. The reaction was considered complete when the hydroxyl number and the acid number reached the expected numbers.

Example 6

Melamine polyphosphate-Containing Polyester

| Ingredients | weight, grams | N, ppm based on triazine in polyester molecule | mole % in polyester molecule |
|---|---|---|---|
| diethylene glycol | 128.7 | | 20.55 |
| PEG200 | 485.4 | | 41.22 |
| trimethylolpropane | 65.1 | | 8.31 |
| terephthalic Acid | 197.3 | | 15.89 |
| phthalic Anhydride | 75.4 | | 7.6 |
| melamine | 50.0 | 30,952 ppm | 6.39 |
| polyphosphoric acid | 50.0 | | |
| catalyst | 0.06 | | |
| reaction Temperature ° C. | 240 | | |
| total charge | 1,061.0 | | |
| water distilled | 61.0 | | |
| total yield | 1,000.0 | | |
| hydroxyl number | 305.0 | | |
| acid number | 1.00 | mole % total => | 100.0 |

Procedure:

A four neck glass flask, equipped with a nitrogen inlet, a stirrer, a column, and a thermometer, was charged with the catalyst, diethylene glycol, PEG200 (polyethylene glycol, molecular weight 200), trimethylolpropane, terephthalic acid, phthalic anhydride and melamine. The temperature was increased to 240° C., while the column was kept hot with the electric wire. The nitrogen and agitation were increased, as the reaction proceeded, to facilitate the water removal, but not rapid enough to blow out the glycol.

Hydroxyl number and acid number were checked as needed and the loss of glycol during the reaction was adjusted with diethylene glycol to reach the theoretical hydroxyl number. The reaction was considered complete when the hydroxyl number and the acid number reached the expected numbers. The temperature was lowered down to 100° C.; polyphosphoric acid was added with stirring for 30 minutes.

Example 7

Melamine cyanurate-Containing Polyester

| Ingredients | weight, grams | N, ppm based on triazine in polyester molecule | mole % in polyester molecule |
|---|---|---|---|
| diethylene glycol | 154.4 | | 25.13 |
| PEG200 | 582.3 | | 50.38 |
| terephthalic Acid | 146.0 | | 12.13 |
| phthalic Anhydride | 55.8 | | 5.83 |
| melamine | 50.0 | 30,952 ppm | 6.5 |
| cyanuric acid | 50.0 | | |
| catalyst | 0.03 | | |
| reaction Temperature ° C. | 250 | | |
| total charge | 1,038.4 | | |
| water distilled | 38.4 | | |
| total yield | 1,000.0 | | |
| hydroxyl number before adding cyanuric acid | 370.0 | | |
| hydroxyl number | 350.0 | | |
| acid number before adding cyanuric acid | 1.0 | | |
| acid number | 1.00 | mole % total | 100.0 |

Procedure:

A four neck glass flask, equipped with a nitrogen inlet, a stirrer, a column, and a thermometer, was charged with the catalyst, diethylene glycol, PEG200 (polyethylene glycol, molecular weight 200), terephthalic acid, phthalic anhydride and melamine. The temperature was increased to 250° C., while the column was kept hot with the electric wire. The nitrogen and agitation were increased, as the reaction proceeded, to facilitate the water removal, but not rapid enough to blow out the glycol.

Hydroxyl number and acid number were checked as needed and the loss of glycol during the reaction was adjusted with diethylene glycol to reach the theoretical hydroxyl number. The reaction was considered complete when the hydroxyl number and the acid number reached the expected numbers. The temperature was maintained at 250° C.; cyanuric acid was added and the mixture was continued to cook for 12 hours. Hydroxyl number and acid number were checked as needed and the loss of glycol during the reaction was adjusted with diethylene glycol to reach the theoretical hydroxyl number. The reaction was considered complete when the hydroxyl number and the acid number reached the expected numbers.

Comparative Example

This example illustrates the polyester preparation without melamine.

| Ingredients | weight, grams |
|---|---|
| diethylene glycol | 143.3 |
| PEG200 | 540.5 |
| glycerine | 45.3 |
| terephthalic Acid | 242.1 |
| phthalic Anhydride | 92.5 |
| melamine | 0 |
| catalyst | 0.03 |
| reaction Temperature ° C. | 240 |
| total charge | 1,063.8 |
| water distilled | 63.8 |
| total yield | 1,000.0 |
| hydroxyl number | 305.0 |
| acid number | 1.00 max. |

Procedure:

A four neck glass flask, equipped with a nitrogen inlet, a stirrer, a column, and a thermometer, was charged with the catalyst, diethylene glycol, PEG200 (polyethylene glycol, molecular weight 200), glycerine, terephthalic acid, and phthalic anhydride. The temperature was increased to 240° C., while the column was kept hot with the electric wire. The nitrogen and agitation were increased, as the reaction proceeded, to facilitate the water removal, but not rapid enough to blow out the glycol.

Hydroxyl number and acid number were checked as needed and the loss of glycol during the reaction was adjusted with diethylene glycol to reach the theoretical hydroxyl number. The reaction was considered complete when the hydroxyl number and the acid number reached the expected numbers.

The polyesters of the invention are particularly suitable for the production of polyurethane and/or polyisocyanurate products having inherent flame-retardant properties without the need to add solid or liquid flame retardants, by adding solid or liquid flame retardants in amounts which are substantially lower than those which are conventionally used.

Accordingly, the present invention also includes the manufacture of polyurethane and polyisocyanurate products, particularly polyurethane foams, from the polyester polyols described above, and also includes polyurethanes and polyisocyanurates product so prepared.

The preparation of polyurethane or polyisocyanurate products using the polyesters described herein may follow any of the methods well known in the art, see Saunders and Frisch, Volumes I and II Polyurethanes Chemistry and technology, 1962, John Wiley and Sons, New York, N.Y. or Gum, Reese, Ulrich, Reaction Polymers, 1992, Oxford University Press, New York, N.Y. or Klempner and Sendijarevic, Polymeric Foams and Foam Technology, 2004, Hanser Gardner Publications, Cincinnati, Ohio.

It is convenient in many applications to provide the components for polyurethane or polyisocyanurate foams in pre-blended formulations. Most typically, the foam formulation is pre-blended into two components. The isocyanate and optionally other isocyanate compatible raw materials, including but not limited to blowing agents and certain silicone surfactants, comprise the first component, commonly referred to as the "A" component. The polyol mixture composition, including surfactant, catalysts, blowing agents, and optional other ingredients comprise the second component, commonly referred to as the "B" component. Polyurethane or polyisocyanurate foams are readily prepared by bringing together the A and B side components either by hand mix for small preparations and, preferably, machine mix techniques to form blocks, slabs, laminates, pour-in-place panels and other items, spray applied foams, froths, and the like. Optionally, other ingredients such as relatively low amount of fire retardants, colorants, auxiliary blowing agents, water, and even other polyols can be added as a stream to the mix head or reaction site. Most conveniently, however, they are all incorporated into one B component as described above.

Polyurethanes and polyisocyanurates are made by reacting a di- or polyisocyanate with the described polyester polyol, which may be used as the only polyester or in admixture with conventional polyether polyols and polyester polyols.

A foamable composition suitable for forming a polyurethane or polyisocyanurate foam may be formed by reacting an organic polyisocyanate and the polyol premix composition described above including the polyester of the invention. Any organic polyisocyanate can be employed in polyurethane or polyisocyanurate foam synthesis inclusive of aliphatic and aromatic polyisocyanates. Suitable organic polyisocyanates include aliphatic, cycloaliphatic, aromatic, and heterocyclic isocyanates which are well known in the field of polyurethane chemistry. These are described in, for example, U.S. Pat. Nos. 4,868,224; 3,401,190; 3,454,606; 3,277,138; 3,492,330; 3,001,973; 3,394,164; 3,124.605; and 3,201,372. Preferred as a class are the aromatic polyisocyanates.

Representative organic polyisocyanates correspond to the formula:

wherein R is a polyvalent organic radical which is either aliphatic, aralkyl, aromatic or mixtures thereof, and z is an integer which corresponds to the valence of R and is at least two. Representative of the organic polyisocyanates contemplated herein includes, for example, the aromatic diisocyanates such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; the aromatic triisocyanates such as 4,4',4"-triphenylmethane triisocyanate, 2,4,6-toluene triisocyanates; the aromatic tetraisocyanates such as 4,4'-dimethyldiphenylmethane-2,2'5,5'-tetraisocyanate, and the like; arylalkyl polyisocyanates such as xylylene diisocyanate; aliphatic polyisocyanate such as hexamethylene-1,6-diisocyanate, lysine diisocyanate methylester and the like; and mixtures thereof. Other organic polyisocyanates include polymethylene polyphenylisocyanate, hydrogenated methylene diphenylisocyanate, m-phenylene diisocyanate, naphthylene-1,5-diisocyanate, 1-methoxyphenylene-2,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate; Typical aliphatic polyisocyanates are alkylene diisocyanates such as trimethylene diisocyanate, tetramethylene diisocyanate, and hexamethylene diisocyanate, isophorene diisocyanate, 4,4'-methylenebis(cyclohexyl isocyanate), and the like; typical aromatic polyisocyanates include m-, and p-phenylene disocyanate, polymethylene polyphenyl isocyanate, 2,4- and 2,6-toluenediisocyanate, dianisidine diisocyanate, bitoylene isocyanate, naphthylene 1,4-diisocyanate, bis(4-isocyanatophenyl) methene, bis(2-methyl-4-isocyanatophenyl)methane, and the like. Preferred polyisocyanates are the polymethylene polyphenyl isocyanates, Particularly the mixtures containing from about 30 to about 85 percent by weight of methylenebis (phenyl isocyanate) with the remainder of the mixture comprising the polymethylene polyphenyl polyisocyanates of functionality higher than 2. These polyisocyanates are prepared by conventional methods known in the art. In the present invention, the polyisocyanate and the polyol are employed preferably in amounts which will yield an NCO/OH stoichiometric ratio in a range of from about 0.9 to about 5.0. In the present invention, the NCO/OH equivalent ratio is, preferably, about 1.0 or more and about 3.0 or less, with the ideal range being from about 1.1 to about 2.5. Especially suitable organic polyisocyanate include polymethylene polyphenyl isocyanate, methylenebis(phenyl isocyanate), toluene diisocyanates, or combinations thereof.

In the preparation of polyisocyanurate foams, trimerization catalysts are used for the purpose of converting the blends in conjunction with excess A component to polyisocyanurate-polyurethane foams. The trimerization catalysts employed can be any catalyst known to one skilled in the art, including, but not limited to, glycine salts, tertiary amine trimerization catalysts, quaternary ammonium carboxylates, and alkali metal carboxylic acid salts and mixtures of the various types of catalysts. Preferred species within the classes are sodium acetate, potassium octoate, and sodium N-(2-hydroxy-5-nonylphenol)methyl-N-methylglycinate; (2-hydroxypropyl)trimethylammonium 2-ethylhexanoate (TMR® sold by Air Products and Chemicals); (2-hydroxypropyl)trimethylammonium formate (TMR-2® sold by Air Products and Chemicals); and Toyocat TRX sold by Tosoh, Corp.

Owing the autocatalytic function of the polyester of the invention, low amounts of catalyst may be used.

In addition to the previously described ingredients, other ingredients such as, dyes, fillers, pigments and the like can be included in the preparation of the foams. Dispersing agents and cell stabilizers can be incorporated into the present blends. Conventional fillers for use herein include, for example, aluminum silicate, calcium silicate, magnesium silicate, calcium carbonate, barium sulfate, calcium sulfate, glass fibers, carbon black and silica. The filler, if used, is normally present in an amount by weight ranging from about 5 parts to 100 parts per 100 parts of polyol. A pigment which can be used herein can be any conventional pigment such as titanium dioxide, zinc oxide, iron oxide, antimony oxide, chrome green, chrome yellow, iron blue siennas, molybdate oranges and organic pigments such as para reds, benzidine yellow, toluidine red, toners and phthalocyanines.

The polyurethane or polyisocyanurate foams produced can vary in density from about 0.5 pounds per cubic foot to about 60 pounds per cubic foot, preferably from about 1.0 to 20.0 pounds per cubic foot, and most preferably from about 1.5 to 6.0 pounds per cubic foot. The density obtained is a function of how much of the blowing agent or blowing agent mixture plus the amount of auxiliary blowing agent, such as water or other co-blowing agents is present in the A and/or B components, or alternatively added at the time the foam is prepared. These foams can be rigid, flexible, or semi-rigid foams, and can have a closed cell structure, an open cell structure or a mixture of open and closed cells. These foams are used in a variety of well known applications, including but not limited to thermal insulation, cushioning, flotation, packaging, adhesives, void filling, crafts and decorative, and shock absorption.

The polyester of the invention can also be used for the production of cast elastomers, thermoplastic polyurethanes, adhesives, coatings, sealants, fibres endowed with flame-retardant properties.

Example 8

Formulation of Spray Rigid Foam

| Ingredients | weight, grams |
|---|---|
| polyester | 66.0 |
| Carpol MX-425 | 23.0 |
| Carpol GSP-355 | 11.0 |
| Jeffcat DMEA | 0.50 |
| Dabco K-15 | 0.25 |
| Polycat 33 | 0.15 |
| water | 2.14 |
| HFC-245fa | 15.90 |
| Dabco DC193 | 1.24 |
| PAPI 27 | 120.2 |

Polyester: inventive Example 1 or Comparative Example
Carpol MX-425: Mannich polyether from Carpenter
Carpol GSP-355: sucrose/glycerine-initiated polyether from Carpenter
Jeffcat DMEA: amine catalyst from Huntsman
Dabco K-15: potassium octoate catalyst from Air Products
Polycat 33: amine catalyst from Air Products
HFC-245fa: blowing agent from Honeywell
Dabco DC 193: silicone surfactant from Air Products
PAPI 27: polymeric isocyanate from Dow
Procedure:

The foams were prepared by hand-mixing using a batch mixer. The materials used were kept at room temperature prior to usage. A master batch of blending polyester, polyether, all catalysts, water, blowing agent, and surfactant was prepared and mixed very well to form B-side. Add 50 grams of B-side mixture in a paper cup. A-side (polymeric isocyanate) was then added to the mixture and stirring was continued for 6 seconds. The rate of foam formation was monitored by measuring the foam height and rate using Foamat instrument (supplied by Messtechnik GmbH). Physical properties were conducted after 2 weeks at room temperature aging.
Physical Properties of Spray Rigid Foam

| Properties | Inventive Example 1 | Comparative |
|---|---|---|
| flammability resistance, burn through time, seconds | 37 | 11 |
| flammability resistance, Butler chimney, mass retention, % | 87% | 81% |
| compressive strength (parallel), psi | 34 | 28 |
| compressive strength (perpendicular), | 32 | 26 |
| friability resistance, weight loss, % | 0% | 2% |
| closed cell, % | 94% | 93% | burn through time: Bureau of Mines Flame Penetration Test Apparatus
Butler chimney: ASTM D3014
compressive strength: ASTM D1621
friability: ASTM C421
closed cell: ASTM D2226

What is claimed is:

1. A flame-retardant polyester polyol obtained by reacting an aromatic or aliphatic dicarboxylic acid and/or ester or anhydride thereof, with an aliphatic polyol or mixtures thereof and with melamine, wherein said aliphatic polyol comprises at least a glycol and optionally an aliphatic polyol having more than two OH groups selected from the group consisting of glycerin, trimethylolpropane, pentaerythritol, dipentaerythritol, tripentaerythritol, sorbitol, glucose, sucrose, polyglycerol and mixtures thereof, said polyester polyol comprising compounds of the formula:

wherein
R$_1$ is an alkylene group —(CH$_2$)$_n$— wherein n is an integer from 1 to 20 or an oxyalkylene group —[(CH$_2$)$_m$—O]$_p$—(CH$_2$)$_r$, wherein m is an integer from 1 to 10, p is an integer from 1 to 10 and r is an integer from 1 to 10,
R$_2$ is an aromatic or aliphatic group, and
x, y and z, independently one from the other are integers from 1 to 20.

2. The polyester of claim 1, wherein R$_2$ is phenyl.

3. The polyester of claim 1, wherein R$_1$ is an alkylene group —(CH$_2$)$_n$— wherein n is an integer from 2 to 12.

4. The polyester of claim 1, having a number average molecular weight of from 200 to 6000 Dalton.

5. The polyester of claim 1, obtained by reacting said aliphatic or aromatic dicarboxylic acid, ester or anhydride thereof with said aliphatic polyol or a mixture of aliphatic polyols in the presence of added melamine, at a temperature from 120 to 300° C. for a time of from 5 to 50 hours.

6. The polyester of claim 1, wherein melamine is added at an amount in order to achieve in the final polyester an amount of melamine of from 0.5 to 60% wt, referred to the weight of the final polyester.

7. The polyester of claim 1, wherein melamine is added at an amount in order to achieve in the final polyester an amount of melamine of from 10 to 40% wt referred to the weight of the final polyester.

8. The polyester of claim 1, comprising:
a) dicarboxylic acid, ester thereof or anhydride thereof derived moieties,
b) polyol derived moieties and
c) melamine derived moieties, wherein the melamine derived moieties are present in the polyester backbone in a molar amount of from 5 to 40% by moles, referred to the sum of a), b) and c) moles.

9. The polyester of claim 1, wherein said melamine derived moieties are present in the polyester backbone in a molar amount of from 10 to 30% by moles.

10. A melamine cyanurate-containing polyester obtained by further neutralizing the polyester of claim 1 with cyanuric acid.

11. The melamine cyanurate-containing polyester of claim 1, comprising cyanuric acid derived moieties in the amount of from 0.5 to 30% wt referred to the final melamine cyanurate polyester.

12. A melamine polyphosphate-containing polyester obtained by further neutralizing the polyester of claim 1 with polyphosphoric acid.

13. The melamine polyphosphate-containing polyester of claim 12, comprising polyphosphoric acid in the amount of from 0.5 to 30% wt referred to the final melamine polyphosphate-containing polyester.

14. A method for producing a polyurethane or polyisocyanurate having flame-retardant properties by reacting the polyester according to any of claim 1, 10 or 12 with a di- or polyisocyanate.

15. A polyurethane or polyisocyanate having flame-retardant properties obtained by reacting the melamine containing polyester according to claim 1, 10 or 12 with a di- or polyisoacyanate.

16. A method for producing polyurethanes or polyisocyanurates having flame-retardant properties by reacting a di- or polyisocyanate with a polyester polyol obtained by reacting an aromatic or aliphatic dicarboxylic acid and/or ester or anhydride thereof, with an aliphatic polyol or mixtures thereof and with melamine, wherein said aliphatic polyol comprises at least a glycol and optionally an aliphatic polyol having more than two OH groups selected from the group consisting of glycerin, trimethylolpropane, pentaerythritol, dipentaerythritol, tripentaerythritol, sorbitol, glucose, sucrose, polyglycerol and mixtures thereof, comprising:
a) dicarboxylic acid, ester thereof or anhydride thereof derived moieties,
b) polyol derived moieties and
c) melamine derived moieties, wherein the melamine derived moieties are present in the polyester backbone in a molar amount of from 5 to 40% by moles, referred to the sum of a), b) and c) moles, said polyester polyol having melamine in the polyester backbone and having a number average molecular weight from 200 to 6000 Dalton.

* * * * *